United States Patent Office 2,802,737
Patented Aug. 13, 1957

2,802,737

PROTEIN FOOD PRODUCT AND PROCESS

Mortimer Louis Anson, New York, N. Y., and Morton Pader, West Englewood, N. J., assignors to Lever Brothers Company, New York, N. Y., a corporation of Maine No Drawing. Application May 14, 1954,
Serial No. 429,983

29 Claims. (Cl. 99—14)

This application is a continuation-in-part of our copending application Serial No. 304,844, filed August 16, 1952.

The aforesaid copending application describes and claims the preparation from inexpensive protein sources of food products which simulate to a remarkable extent the chewiness, moistness, and texture of meat and meat products, both in the mouth and in appearance.

The present invention is also concerned with the utilization of gel precursors, such as those described in the aforesaid copending application, for the manufacture of protein food products which simulate meats and meat products of varying kinds. In accordance with the present invention, it has been found that highly acceptable protein food products can be prepared by a process comprising blending a protein gel precursor with an outer additive comprising a minor amount of dough to provide a non-uniform mixture in which the dough and gel precursor form distinct phases. The mixture is then heated to convert the gel precursor into a chewy protein gel. The final product of the present invention when ready for use may therefore be described as comprising a non-uniform mixture of chewy protein gel and a minor amount of dough.

The term "dough" is used herein to connote a dough which is prepared by mixing and kneading ingredients comprising water and gluten or a gluten-containing material such as wheat flour, rye flour or other flour having dough-forming properties. The dough which we blend with the gel precursor in the preparation of our protein food product is a conventional type of dough similar to that used in ordinary baking. As aforesaid, the dough can be prepared from substantially pure gluten or from any type of flour containing gluten and having dough-forming properties. We prefer to use ordinary wheat flour although any flour of similar dough-forming properties can also be used. Preparation of the dough is conventional and can be performed in standard bakery equipment. The proportions of flour and water are not critical and are within the skill of the art since the proportion of flour and water can be adjusted to give a dough of any desired consistency depending on the type of product to be made. With wheat flour, we have found that about 8 parts by weight of flour to about 3 to 5 parts by weight of water gives a highly satisfactory dough. With other types of flour more or less water may be used according to the nature of the flour. The dough can also contain other ingredients such as fat, flavoring additives, protein and the like. It is often advantageous, for example, to use dough which contains up to one part of fat for each part of water.

A wide variety of products may be made according to the invention. For example, we can prepare protein food products which resemble cooked muscle meat, hamburgers, meat patties, meat loaves, sausages, and meat products such as canned and sliced luncheon meats as well as other variety meat products which are prepared from the flesh of fish, fowl or mammal.

The use of dough according to the invention has several purposes and leads to many advantages as will be seen.

One contribution of the dough lies in the improvement of the appearance of the product because streaks and particles of dough in the product provide the non-uniform appearance which characterizes many meats and meat products. In addition, the dough contributes to the formation of a product which has the chewiness of meat or a meat product by preventing the shattering of the chewy protein gel into granules or particles as is often the case when dough is not used. Further, the dough also augments the structure of the chewy protein gel which is particularly noticeable when our portein food product is fried or heated, the dough in the product preventing it from becoming excessively soft at higher temperatures.

Still a further contribution of the dough is that in some cases it acts as a barrier to the interpenetration of phases and makes possible the addition of certain additives, e. g., fat or water, in a phase external to the gel precursor by preventing the penetration of the gel precursor by the additive which, in many cases, interferes with subsequent chewy gel formation.

The proportions of dough and gel precursor to be used in accordance with the invention are fairly well defined because if too much dough is present, the resultant product will be pasty and soft and lack sufficient chewiness. On the other hand, when the concentration of dough is too low, the product shatters when it is chewed. We have found in accordance with these considerations that the amount of dough should be from about 3 to about 30% by weight of the final product.

The manner of blending the gel precursor and dough depends primarily upon the type of meat or meat product that is to be simulated. In all cases the blending should be controlled to avoid too thorough mixing which would result in an intimate mixture of dough and gel precursor and result ultimately in poor gelation. On the other hand, the blending should be sufficient to allow the dough to perform its functions as fully as possible. To illustrate, if it is desired to simulate a fibrous meat such as pot roast, the gel precursor can be extruded as thin cylinders as described in the aforesaid copending application Serial No. 304,844 which are then layered in mat form with sheets, cylinders or strands of dough being interposed between every few layers of cylinders. In making a product which resembles hamburger, a sandwich comprising alternate layers of gel precursor and relatively thinner layers of dough can be formed, compressed and then chopped into pieces approximating the size of the meat particles in a hamburger.

Dough is a particularly valuable outer additive in the manufacture of simulated canned luncheon meats such as "Spam" and the sliced luncheon meats such as are commonly sold in transparent packages in the delicatessen departments of food stores. In making a product which resembles certain types of sliced luncheon meat remarkable success is achieved by blending the gel precursor and dough in such manner that there is provided a non-uniform mixture in which discrete layers of gel precursor are separated by relatively thinner layers of dough. In this manner, there is produced a laminated type product in which the layers of dough give a streaky non-uniform appearance such as one finds in meat.

The blending of the dough and gel precursor in making a laminated type luncheon meat can be accomplished either by hand or by mechanical operations. In a preferred method, layers or sheets of gel precursor and of dough are prepared, e. g., by extrusion, and then assembled alternately to form a multiple layer sandwich-like structure. Since it is usually not practical to produce sheets of dough of the desired thinness by extrusion, the sandwich-like structure is then compressed, e. g., by rolling, to further decrease the thinness of the sheets of dough and gel precursor.

An alternative method of dividing the gel precursor by thin layers of dough comprises distributing the dough roughly into the gel precursor and then passing the mixture past the whirling knives of a Silent Cutter, a machine used in the conventional preparation of sausage meat. This cutting in should be carefully controlled to avoid too thorough mixing which may interfere with the subsequent gelation of the blend.

Another type of product, with a somewhat different appearance, can be made without lamination of the dough and gel precursor by blending in such manner to obtain a menstrum of gel precursor in which is embedded small irregular pieces of dough varying in diameter from less than 1/16 of an inch up to about 1/2 inch. Products of this description can be prepared by adding the gel precursor and dough in the mixing bowl of machines such as the Hobart Food Cutter and running the machine for a few revolutions of the bowl, taking care to stop the mixing operation before the gel precursor and dough become too intimately admixed with each other.

Regardless of the method of blending, after the dough and gel precursor have been properly blended, the mixture is filled into cans, or molded, and heated, preferably while in an air-tight container, and preferably by steam autoclaving or by immersion in boiling water. The resultant product can be sold in the container or mold or it can be removed and sliced and sold in cellophane, polyethylene or like packages. Alternatively, the mixture may be sliced prior to heating in those instances where it has sufficient structure to so permit.

The gel precursor which is the primary ingredient used in the preparation of the protein food product can be prepared according to any of the general procedures described in the aforesaid copending application Serial No. 304,844, filed August 16, 1952. There are, however, certain preferences involved in the selection of a gel precursor for use in this invention although these preferences are not invariably essential to the obtention of satisfactory products. The preferences arise chiefly from the fact that the gel precursor should have sufficient body or structure, i. e., firmness, to facilitate its blending with the dough to produce a non-uniform blend. For example, if the gel precursor is too soft, it is not physically possible to sheet the dough or to blend the dough properly, or to obtain a gel precursor-dough mixture which can be handled. If the gel precursor has too much structure, i. e., is too stiff, proper blending with the dough is likewise difficult because the gel precursor tends to break up into extremely small fragments. Of course, the gel precursor must also be capable of yielding a chewy gel of the desired character when heated and the resultant chewy gel must be relatively free from off-flavor.

The first step in the preparation of the gel precursor is to isolate or obtain on the market an edible protein of good flavor and free from any substituents which might inhibit the formation of a gel. Preferred sources of protein from which irreversible gels can be obtained are oilseeds such as the soybean and the peanut. In extracting the protein from oilseed meal, any method which does not adversely affect the flavor or gelling characteristics of the protein can be employed. In this connection it is pointed out that soy protein as it exists in soy meal contains a gel inhibitor of unknown composition which sometimes interferes with the gelation of isolated soy protein. This gel inhibitor can be eliminated by using a proper method of extraction. Several methods of extraction are known and we have found these suitable for the preparation of good gelling protein. The following methods of extraction are those preferred in the present invention.

In the case of soy protein, a preferred extraction procedure devised by us comprises suspending flakes of soybean meal in an aqueous solution of calcium hydroxide 0.003 molar with respect to $Ca(OH)_2$. Steam is then sparged into the suspension of flakes, with agitation, until a temperature of about 60° C. is reached. The suspension is then pumped through a centrifuge to obtain a clarified extract which, in the usual instance, has a pH of about 6.8 to 6.9. This method gives essentially complete extraction of protein and provides protein of good quality. As a rule, other practical methods of extraction yield a poorer quality protein when the extraction is complete, and can yield good quality protein only at the expense of incomplete extraction.

The protein in the extract is then precipitated by the addition of acid, such as hydrochloric acid, to bring the pH to about 5 and subsequent centrifugation then yields a solid aqueous suspension of precipitated protein. Preferably, the precipitated protein is then resuspended in water for purposes of washing, and centrifuged again. The washed, precipitated protein can then be dried preparatory to making a gel precursor therefrom or it can be stored in the wet state. If the precipitated protein is to be kept for a long time, it is preferred to spray or tray dry the material for purposes of storage although the wet cake of precipitated protein can be stored at low temperatures for reasonable lengths of time.

Other methods of extraction and precipitation of soy protein which we have found to provide good gel-forming protein are also suitable. For example, a good protein can be obtained when soybean flakes are extracted in an aqueous 0.003 molar solution of calcium chloride at a pH of about 6.8 to 7. Another sutable extract method comprises washing soy meal with acidified water at a pH of about 4.8 followed by extraction of the protein in aqueous sodium hydroxide at a pH of about 7.2. Still another suitable method comprises extracting the protein from soy meal in cold water or in water at room temperature.

In the case of peanut protein, peanut meal can be suspended in a 0.0015 molar suspension of calcium chloride and passed through a colloid mill, brought to pH 6.8 with sodium hydroxide, and then clarified by centrifugation. The clarified extract is then acidified while held at a temperature ranging from room temperature up to about 95° C. in order to precipitate the protein. Good peanut protein can also be obtained by extraction of peanut meal in aqueous sodium hydroxide solution. Temperatures and pH's of the extraction and precipitation steps can be varied to modify the properties of the precipitated protein as desired. The choice of precipitation temperature depends primarily on the amount of structure desired in the gel precursor, the higher the temperature the greater the firmness of the precipitated protein in aqueous suspension.

In order to convert the precipitated protein into a gel precursor, it is usually necessary to adjust the pH and protein concentration which are the principal factors in influencing the subsequent formation of a chewy protein gel. For the purposes of the present invention, it is preferred that the gel precursor have a pH from about 6 to about 7.5 and a solids content of from about 14 to 35% by weight. The adjustment of pH and protein concentration ordinarily requires the addition of both water and alkali such as NaOH. In cases where the protein is dried prior to the preparation of a gel precursor therefrom, the adjustment of pH may be made at the time of drying.

As above stated, the gel precursor must have sufficient structure to permit proper blending with the dough. The principal factors affecting this structure are protein concentration, the temperature at which the protein has been precipitated and other lesser variables such as the amount of carbohydrate remaining in the protein, the manner in which the protein was dried and the amounts of sodium chloride or other materials contained therein. However, protein content is one of the most important considerations and by varying the protein content within the above stated range of 14 to 35%, the structure desired for any particular type of product can ordinarily be obtained.

It has been found that another factor affecting the structure or degree of plasticity of a gel precursor is its pH history. If, for example, the precipitated protein is convented into a gel precursor by the addition of alkali first to a pH of about 8 to 9 and then brought back to a pH from 6 to 7.5 by the addition of acid, the temporary exposure to a relatively high pH results in a gel precursor which is much firmer than a gel precursor of the same solids content but which has not been temporarily exposed to the higher pH. This means that by temporarily increasing the pH during the pH adjustment of the gel precursor, a gel precursor of requisite structure can be made with lower solids content than otherwise required.

It has further been found that the quality of the gel precursor for our purposes can be improved by mixing an animal or vegetable fat therewith. This improves both the working properties of the gel precursor and the eating qualities of the products prepared therefrom. An amount of fat up to about 20% by weight of the gel precursor can be used.

Before blending the dough and the gel precursor together, it may sometimes be desirable to heat the precursor to partial gelation to obtain increased firmness as disclosed in our aforesaid copending application Serial No. 304,844. However, this is not a necessary step and is usually omitted unless one desires to prepare a gel precursor having the requisite firmness at a protein content somewhat lower than usual. On the other hand, flavoring and coloring additives may be mixed with the gel precursor before or during blending with the dough to obtain uniform distribution of such additives.

Although the preceding discussion shows that the quality and character of the gel precursor is influenced by a number of variables, the character of the ultimate chewy protein gel prepared from the gel precursor is primarily influenced by protein concentration, i. e., the composition of the gel precursor. The pH history and intermediate heating of the gel precursor thus have little effect on the chewiness and other properties of the ultimate chewy protein gel.

Although mention of the incorporation of flavoring additives and coloring additives has been omitted in the preceding description, it is to be understood that such additives are usually employed in ordr to provide a product which resembles the ordinary variety meats as closely as possible. The flavoring and coloring additives are ordinarily used in the conventional small amounts and may be incorporated in various ways. Ordinarily, we prefer to add a coloring additive to the gel precursor in order to give it the color of meat. Any of the coloring additives approved for use in food can be used but we have achieved particularly good success with water-insoluble dye known as Carmine NF#40 instead of the more usual soluble dyes. This dye does not brown when it is heated during the later processing of the product and, furthermore, it does not bleed into the dough, thus providing greater color contrast in the final product.

The flavoring additives likewise can be any of those approved for use in food. Ordinarily, we prefer to use additives which will impart the taste of meat or a meat product and several such additives are known and have been used for related purposes. Flavoring additives can be incorporated in the gel precursor or in the dough or in a phase external to both of these primary ingredients. Again, the manner in which the flavoring additives are incorporated depends largely on the type of product that is to be made. It is desirable when possible to add flavoring additives, to the dough prior to its blending with the gel precursor since flavoring additives incorporated in this manner are readily releasable when the product is eaten. However, the incorporation of certain flavoring additives directly in dough adversely affect the stretchability and strength of the dough and when making a laminated type of product, for example, the mechanical blending procedure requires a dough of maximum strength and stretchability. Thus, in that type of product we usually prefer to add the flavoring additives in an external phase.

Other materials which are optionally blended with the dough and gel precursor in a phase external to both primary ingredients and which, if desired, may serve as a vehicle for flavoring additives will be referred to hereinafter as a "third phase."

In some of the products eating quality is improved by the introduction of a third phase which is distinct from the gel and dough phases and which is distributed throughout the product as pockets, streaks, etc. Preferred ingredients of the third phase are fat, protein, water or a combination of these ingredients.

The third phase, like outer additives of our copending application, can act as a binder and improve appearance. Its two major functions, however, are (1) to increase the juicy fatty feel of the product in the mouth and (2) to hold flavor in a readily releasable form, instead of the locked-in form of some flavor in the gel phase.

In some products, the third phase is added for juiciness, in some for flavor purposes, in some for both juiciness and good flavor release.

The third phase is very variable in composition. It can consist simply of fat or water or a fat-water emulsion. It is preferred, however, that the third phase comprises an aqueous suspension of protein—with or without fat, emulsifier, flavoring and coloring materials, gums, etc. The protein both holds in the water and acts as a binder. In some cases, the protein—e. g., gelatin—is added as a solid and withdraws water from the other phases to form the aqueous suspension of the third phase.

The exact composition of the third phase depends on the exact character of the product. This is illustrated by the following examples. In a canned product similar to canned luncheon meat the third phase advantageously contains casein and fat to give juiciness. This third phase might be made, for example, by homogenizing a mixture comprising a 10% aqueous solution of sodium caseinate and fat. The third phase containing casein and fat, however, is not a strong enough binder if the product is to be packaged as thin slices. The binder is made strong enough even for thin slices by the substitution of gelatin for casein, and by the elimination of fat or the reduction in its amount. Gelatin, however, cannot be used if the slices are to be heat treated. For slices which can withstand heat treatment we prefer to use a suspension of soy protein which is converted into a relatively weak irreversible gel by the heat processing. This weak gel third phase is a strong binder, gives good flavor release and resists heat treatment. Although the weak gel containing soy protein does not make a significant contribution to juiciness, the slices are adequately juicy if they are treated as described below.

The amount of third phase relative to the amounts of gel precursor and dough can be widely varied. As stated previously, a satisfactory product can be prepared without the incorporation of any third phase but the addition of such a third component in any amount up to about 50% by weight of the total product will normally effect an appreciable improvement in the product.

The third phase is preferably incorporated subsequent to the blending of the gel precursor and dough. The principal object is to blend a third phase in such a manner that it will be randomly distributed throughout the product externally of the gel precursor and dough. This can be done in the laminated type product, for example, by flattening the gel precursor-dough sandwich to a height of about ½" and then spreading over it a layer of the third phase. The mass is then folded over on itself and the spreading and folding opreation repeated three or four times. In this manner the third phase is mixed with the other ingredients in such a way that discrete pockets, layers, and globules of the third phase appear randomly in the final product. Care should be taken because too extensive mixing in of the third phase can result in a soft product which is inadequately gelled.

In the case of products according to the invention which are made in the form of slices resembling ordinary luncheon meat, still further improvement can be obtained by coating each slice with a thin layer of fat, amounting from about 0.3 to about 2% by weight of the slice, before the slices are packaged. This coating of fat serves several purposes. For example, it eliminates the rather sticky feel which uncoated slices often have; it improves the eating quality of the product improving juiciness, fattiness and flavor; it provide a medium for the incorporation of flavor ingredients from which the flavoring additives are readily released during eating; it offers a medium for the incorporation of materials which give off desirable aroma; and it helps prevent the sticking together of packaged slices. For this purpose any edible wholesome fat can be used, low melting fats, or oils, being particularly desirable in order to obtain optimum lack of stickiness. The coating can be applied by any convenient method such as by spraying, brushing or dipping.

From the preceding description, it can be seen that some of the products prepared according to the invention can be sold directly in the can in which they are autoclaved to convert the gel precursor into a chewy protein gel. However, other types of products, such as the sliced products, are ordinarily removed from the mold and then sliced and packaged. The slicing and packaging operation often leads to bacteriological contamination of the product which strongly detracts from its keeping qualities. This brings to light another advantage of our products since they are, for the most part, pasteurizable, so that their keeping qualities can be vastly improved. For instance, any of our products which do not contain appreciable quantities of fat or other meltable materials such as gelatin, can be pasteurized by heat after packaging and products so pasteurized are storable under refrigeration for several weeks. This is an advantage not possible in the case of ordinary luncheon meats which normally contain large quantities of fat that melts at pasteurization temperatures.

In addition to the ingredients hereinabove described, our protein food product may contain conventional minor amounts of various other ingredients which are often used in the manufacture of some variety meats. Thus, our product may contain, for example, various spices, seasonings, and other additives. The product may also contain chopped pickles, chopped olives, chopped pimentos, cereals and similar ingredients.

Also within the scope of the invention are products in which the gel precursor has not been converted to a chewy protein gel, this latter operation being left for the consumer to perform by customary warming or heating of the product.

In order to further illustrate the invention and its inherent benefits and advantages, the following examples are presented in which parts and percentages are by weight unless otherwise specified.

EXAMPLE 1

Dry isolated soybean protein was prepared by extraction with water of soybean meal, clarification of the extract, precipitation of the protein from the extract by the addition of hydrochloric acid to pH 5, collection of the protein as a wet cake, washing of the cake, and finally drying of the cake in a forced air drier at about 140° F.

A gel precursor was then prepared from the dried isolated soy protein preparation as follows: The dry soy protein preparation was placed in an efficient paste mixer. While the mixer was operating, there was added a volume of water sufficient to prepare a protein suspension containing slightly more than 24% protein. Mixing was continued until the suspension was uniform. Then, there was added a volume of dilute sodium hydroxide solution sufficient to raise the pH of the protein suspension to pH 6.5. (The quantity of water in the sodium hydroxide solution was just sufficient to lower the protein content of the mixture to 24%.) Next, a suitable amount of concentrated dye solution was added and mixed in until the color of the mass was uniform. The resulting gel precursor was a uniform, plastic mass.

A dough was prepared by blending 8 parts of all-purpose wheat flour with 5 parts of water in a conventional dough mixer.

An emulsion consisting of a solution of sodium caseinate emulsified with hydrogenated vegetable oil was prepared. To do this, ten parts of sodium caseinate was dissolved in 90 parts of water; fifty parts of melted hydrogenated oil and 1.5 parts of an emulsifying agent were then added to this solution; and finally, the mixture was emulsified by means of an homogenizer.

A flavoring mixture consisting of essential oils, salt, sugar and other flavoring materials was prepared by simple mixing.

The gel precursor, dough, emulsion and mixture of flavoring ingredients were then blended as follows: Three hundred grams of gel precursor and 26 grams of flavoring mixture were mixed together roughly. The resulting mixture was then rolled out to a height of about ½ inch. A sheet of dough weighing about 40 grams was stretched across one-half of the flattened gel precursor. The gel precursor was then folded over the dough, forming a sort of sandwich. The "sandwich" was then gently rolled out to a height of about ½ inch. It was next folded in half and again rolled out to a height of about ½ inch. The folding and rolling out operations were then repeated about 8 times.

The emulsion was next blended with the dough and gel precursor as follows: About 24 grams of the emulsion was spread over the flattened mixture of gel precursor and dough. The mixture was folded to form a sandwich-like structure, over which a second 24 grams of the emulsion was spread. The mixture was again folded sandwich-like, and a final 24 grams of the emulsion was spread over it, in the same way as previously. Finally, the mixture was again folded sandwich-like.

The mixture, which at this stage was a heterogeneous mixture of gel precursor, dough and emulsion, was vacuum packed in a rectangular 12-oz. can and the can and contents were autoclaved for 30 minutes at 15 p. s. i. g. After cooling, the contents of the can were removed as a firm product which could be sliced into even slices. The product resembled an ordinary canned luncheon meat. It was very tasty and chewy and contained about 17.5% of protein, about 5.6% of fat, about 5.7% of flour, about 5.9% of flavoring ingredients and about 65.3% of water.

EXAMPLE 2

A suspension of isolated peanut protein was prepared by extraction with dilute sodium hydroxide solution of peanut meal, clarification of the extract, heating of the extract to 70° C., precipitation of the protein from the extract by the addition of hydrochloric acid to pH 4.8, and collection of the protein as a wet cake containing about 35% protein by means of centrifugation.

A gel precursor was prepared directly from the wet isolated peanut protein suspension as follows: The protein suspension was placed in an efficient paste mixer. While the mixer was operating, there was added a volume of dilute sodium hydroxide solution such that the pH of the resulting paste was 7.0 and the protein content was 28%. Then a suitable amount of a concentrated dye solution was added and mixed in until the color of the mass was uniform. The resulting gel precursor was a uniform, plastic mass.

A dough was prepared as in Example 1. A fat-water emulsion was prepared by homogenizing a mixture of one part of hydrogenated vegetable oil, one part of water, and 0.02 part of an edible oil-in-water emulsifier.

A flavoring mixture was prepared as described in the preceding example.

Three hundred grams of gel precursor and 26 grams of flavoring mix were mixed together. The resulting mixture was then streaked with 60 grams of dough by following the procedure of Example 1, and the fat-water emulsion was next added according to the procedure given in Example 1, using about 50 grams of the emulsion.

The resulting mixture was packaged and heat processed as described in Example 1. The can and contents were then allowed to cool and the resulting product was removed. The product resembled a luncheon meat such as "Spam." It had good flavor and possessed the chewiness and feel of meat in the mouth. It softened relatively little when it was fried.

EXAMPLE 3

The procedure of Example 1 was followed with the exception that the emulsion of fat and sodium caseinate solution was omitted entirely from the formulation. The resulting product was satisfactory. It resembled luncheon meat in taste, appearance and chewiness. It did not, however, possess as much of the juicy, fatty feel and taste of the product prepared as described in Example 1, and, therefore, the product of Example 1 was preferred.

EXAMPLE 4

The procedure of Example 2 was followed except that fat-water emulsion was omitted completely. The resulting product was satisfactory. It resembled luncheon meat in taste, appearance and chewiness. It did not, however, possess as much of the juicy, fatty feel and taste of the product prepared as described in Example 2, and therefore, the product of Example 2 was preferred. The product, however, was extremely juicy and fatty in the mouth when it was fried in a small amount of fat.

EXAMPLE 5

The procedure of Example 1 was followed except for two variations. (1) The flavoring ingredients were mixed with the emulsion rather than with the gel precursor. (2) The final, canned mixture was heated for 1 hour in a boiling water bath instead of being autoclaved. The product obtained was entirely as satisfactory as that obtained by following the procedure of Example 1.

EXAMPLE 6

The procedure of Example 1 was followed, except for three variations. (1) In the preparation of the emulsion 15 parts of isolated soy protein preparation at pH 6.5 in 85 parts of water were substituted for the 10 parts of sodium caseinate in 90 parts of water. (2) The flavoring ingredients were mixed with the emulsion rather than with the gel precursor. (3) The final, canned mixture was heated for 1 hour in a boiling water bath instead of being autoclaved. The product obtained had a slightly different texture than that obtained by following the procedure described in Example 1, but it was nonetheless very much like luncheon meat in appearance and taste and was very acceptable.

EXAMPLE 7

The procedure of Example 1 was followed with the exception that about 25 grams of hydrogenated vegetable oil was used instead of 72 grams of the emulsion. The product obtained was very much like some luncheon meats in appearance and taste, but it was slightly drier in taste than the product whose preparation was given in Example 1.

EXAMPLE 8

The procedure of Example 2 was followed except that the dough was omitted from the formulation. The resultant product was poor for the following reasons: Many parts of the product were not chewy enough; those parts of the product which were chewy shattered into granules when chewed in the mouth; the product was too homogeneous in appearance; the product became undesirably soft when it was fried whereas the product of Example 2 retained its firmness when fried; the product did not have as much juicy, fatty taste as the product of Example 2.

EXAMPLE 9

The procedure of Example 1 was followed except that about 300 grams of dough was used instead of about 40 grams. The resulting product was unacceptable because it did not have a good fatty taste, it was not juicy enough, and its appearance was not enough like that of luncheon meat.

EXAMPLE 10

The procedure of Example 1 was followed except that the mixture of gel precursor, dough and emulsion was chopped up in a food cutter before it was canned. The resulting product was softer than that made as described in Example 1 and it resembled more closely in texture and flavor a soft bologna type product than it did the usual, relatively firm luncheon meat.

EXAMPLE 11

*Preparation of soy protein*

A protein extract was prepared from edible grade soy meal whose nitrogen was practically completely extractable. First, a 5% suspension of soy meal in an aqueous 0.003M CaO solution was prepared. While the suspension was stirred gently, steam was introduced by means of a sparger until the temperature of the suspension was 60° C. The suspension was stirred for 5 minutes while at this temperature. It was then pumped to an efficient centrifuge where practically all of the insoluble matter was removed. The resulting extract contained over 90% of the nitrogen present in the soy meal originally.

The extract, which was at 45–60° C., was stirred vigorously, and approximately 3 N HCl was gradually added until the pH of the resulting slurry was lowered to 5.0. This precipitated the protein. The suspension of protein was then pumped to a basket centrifuge where it was collected as a wet cake containing about 20–30% protein. About 97% of the protein present in the extract was precipitated.

Finally, the protein was washed at 60° C. The protein was next suspended in a volume of water approximately equal to that of the extract from which it was precipitated, and the slurry was passed between the rotor and stator of a colloid mill in order to disperse the protein completely. The dispersion, as it was stirred, was then heated to 60° C. by means of steam, and, after it was at 60° for 5 minutes, it was pumped to a basket centrifuge. The protein was collected in the centrifuge as a white cake containing about 25–30% protein.

A portion of the protein cake was alkali-treated as follows: A quantity of the protein was placed in an efficient paste mixer and that amount of approximately 3 N NaOH needed to raise the pH of the protein slurry to 8–9 was added. The resulting product was allowed to remain at pH 8–9 for a few minutes. Then, an amount of 3 N HCl needed to lower the pH to 7 was added. The resulting protein suspension was thoroughly mixed, and finally it was milled in order to ensure its uniformity.

Another portion of the protein cake was dried as follows: A quantity of the protein cake was placed in an efficient mixer and, while the cake was being mixed, a dilute aqueous solution of NaOH was added to raise the pH of the protein slurry to 7 and sufficient water to lower the protein content to about 10%. The mixture was then mixed until the protein was completely dispersed, and the resulting solution was spray dried.

EXAMPLE 12

*Preparation of laminated-type luncheon slices from spray-dried protein*

A gel precursor was prepared from the spray-dried soy protein of Example 11 as follows: A mixture was made of 210 grams of protein, 710 grams of water, 50 grams of hydrogenated vegetable oil, 30 grams of flavoring materials, and a small amount of approved edible dyestuff. The resulting paste was milled, thereby ensuring complete uniformity.

A dough was prepared by blending 2 parts of wheat flour with 1 part of water in a conventional dough mixer.

A third phase was prepared by mixing together 150 grams of spray-dried protein, 100 grams of flavoring materials consisting of salt, sugar and aromatics, and 750 ml. of water, and milling. The product was a soft, jelly-like mass.

Next, a sandwich-like structure of alternate layers of gel precursor and dough was prepared. This was about 2 inches high, and consisted of 8 layers of gel precursor separated by 7 layers of dough. The gel precursor was placed in an extruder equipped with a die whose opening was 0.13 inch wide and 6 inches long. The dough was placed in an extruder equipped with a die whose opening was 0.02 inch wide and 6 inches long. A layer of gel precursor was extruded as a flat sheet on to a moving table. A layer of dough was then extruded on to the gel precursor layer.

A layer of gel precursor was next extruded on to the dough, and so on until the required number of layers was built up.

The gel precursor-dough mixture was weighed. Then it was compressed. This was done by passing the sandwich through a pair of greased gauge rolls separated ⅛ inch and drawing off the compressed material as a sheet on a moving belt.

The sheet was covered with a thin layer of "third phase," approximately 27 parts of third phase per 100 parts of compressed gel precursor-dough. The mixture of compressed gel precursor-dough with "third phase" was then cut up roughly into pieces of varying size by passing it once through the whirling knives of a Silent Food Cutter.

The cut-up product was then stuffed into a loaf-shaped mold and heat processed in order to convert the gel precursor to gel and to set up the third phase. The mixture of pieces of layered, compressed gel precursor-dough with third phase was placed in a sausage stuffer whose horn was somewhat larger in diameter than conventional sausage stuffer horns. It was forced into a mold approximately 4 inches by 4 inches in cross section and the mold was sealed air tight by means of a heavy, closely fitting rigidly held lid. The mold and contents were then placed in an autoclave, in which they were subjected to 5 p. s. i. g. steam pressure for 2 hours. At the end of 2 hours, the product was cooled by water while under 5 p. s. i. g. air pressure. Finally, it was cooled overnight in a 38° F. room.

The gelled product was removed from the mold and cut into slices about 1/12-inch thick with a conventional meat slicing machine. As each slice was cut it was sprayed on both sides with a mist of oil, and thereby coated with a layer of oil weighing roughly 0.5–1% of the total weight of the slice. The oil-sprayed slices were then packaged under vacuum in polyethylene envelopes of the type commonly used for packaging luncheon meats. Lastly, the packaged product was placed in a 212° F. oven saturated with water vapor, allowed to remain there for ½ hour, cooled overnight in a refrigerator, and stored at low temperature.

The resulting slices were very attractive and resembled pressed ham, had good eating quality, were easily separated from each other, and were stable for several weeks at 40–50° F. both bacteriologically and with respect to eating quality.

EXAMPLE 13

*Preparation of laminated-type luncheon slices from alkali-treated protein*

A quantity of the alkali-treated protein suspension described in Example 11 was mixed with that amount of water needed to lower the protein content of the material to 23%. Then to 920 grams of the mass were added 50 grams of hydrogenated vegetable oil, 30 grams of flavoring materials and dyestuff. The paste was then milled. The resulting gel precursor was used for the preparation of luncheon slices in exactly the same way as the gel precursor of Example 12.

EXAMPLE 14

*Preparation of luncheon slices with dough in a nonlaminated form*

A gel precursor was prepared from the spray-dried soy protein of Example 11 except that it was made to contain only 18% protein. Dough and "third phase" were prepared in a manner identical with that given in Example 12. The three mixtures were then blended in the following manner:

Fifteen hundred grams of gel precursor was placed in the bowl of the Hobart Food Cutter Model 8141, and 200 grams of dough was laid over it in a ring. The machine was run for approximately 30 revolutions of the bowl. At the end of this time, an additional 100 grams of dough was added and the machine was run for approximately 5 revolutions of the bowl. Then, 240 grams of the third phase was added and the machine run for 2 to 5 more revolutions. The mixed mass was removed from the bowl, placed in a modified sausage stuffer, forced into a mold 4 inches by 4 inches in cross section, and further processed as described in Example 12.

The sliced product consisted of a menstruum of chewy protein gel in which were embedded small irregular pieces of dough varying in diameter from less than 1/16 of an inch to about ½ inch. The pieces varied in shape from relatively long, thin strings or sheets to spherical or crudely spherical particles.

EXAMPLE 15

*Preparation of a gel cylinder product containing dough*

A soy protein gel precursor was prepared consisting of 28% heat coagulated soy protein, ½% locust bean gum, 1% salt and 1% fat. This precursor was then extruded as thin cylinders and built up into a mat according to the procedure described in Example 1, part C, of application Serial No. 304,844, except for the introduction of dough in the following way. As the extrusion mixture and outer additive were formed into a mat and rolled with the Teflon-coated roll, dough was extruded as a thin sheet from a die about 0.01 inch wide and laid down on the mat after the extrusion of every 20 to 25 layers of cylinders.

The mat was placed in a container and steamed for 15 minutes. it was next sliced at an angle of about 30° to the direction of the cylinders into slices about ⅛ inch thick. The slices were evenly packed into a rectangular 12-ounce can, the free space around the can was filled with hot fat, the can was sealed, and finally the can with contents was autoclaved for 45 minutes at 15 p. s. i. g. The product was then cooled.

The slices had very nice fibrous meat-like chewiness. The chewiness was somewhat more yielding and pleasant than that of comparable samples made without dough; the gel cylinders had less tendency to separate into individual cylinders during chewing. Also, the slices when heated in a gravy or fried remained appreciably firmer than comparable slices made without dough.

EXAMPLE 16

*Hamburger-like product made with gel-dough particles*

A gel precursor was prepared from spray-dried soy protein as described in Example 12. Dough was prepared by kneading 2 parts of flour with 1 part of water. Then, a gel precursor-dough "sandwich" was formed and compressed as described in Example 12.

The compressed mass was placed in a steam chamber and subjected to steaming at 212° F. for 10 minutes. The partially set-up product was then cooled and chopped up into pieces small enough to pass through a ¼-inch mesh sieve. The formation of an excess of very fine pieces was avoided.

The binding mixture was prepared. It consisted of 20% skim milk powder, 20% wheat flour, 20% hydrogenated vegetable oil, 5% flavoring materials and 35% water, all intimately mixed together into a smooth paste.

Two parts of the chopped steamed gel precursor-dough product were mixed with 1 part of the paste. The mixture was mixed only very gently in order to prevent excessive breakage of the steamed pieces, and long enough to ensure complete, uniform distribution of the pieces in the paste. The mixture was placed in hamburger molds ¾-inch high and 3 inches in diameter and, while in the molds, subjected to live steam at 212° F. for 30 minutes. After cooling, the products were removed from the molds.

The products resembled hamburgers and were cooked as such. The cooked products had a nice, yielding, meat-like chewiness, and were in this respect better than comparable products made with pieces of steamed gel precursor lacking dough.

EXAMPLE 17

*Preparation of luncheon slices with dough containing fat and flavoring materials*

A gel precursor was prepared from spray dried soy protein as described in Example 12 except that it was made to contain only 18% protein whereas the gel precursor of Example 12 contained about 21% protein.

Dough was prepared by mixing, in a 1-quart capacity Read heavy duty mixer with sigmoid arms, 400 grams of wheat flour, 58 grams of flavoring materials (over half of which was salt), 70 grams of hydrogenated vegetable oil, and 165 ml. of water. The resulting dough was stretchy and had dough characteristics, but it was not nearly as stretchy or strong as dough made without flavor mix and fat.

Three hundred grams of dough was then cut into 1500 grams of gel precursor as described in Example 14. The resulting product was stuffed into molds directly; no third phase was added. Further processing was as described in Example 12.

The slices obtained had practically the same texture and appearance as the slices of Example 14. They were, however, somewhat more flavorful, despite the fact that the flavor levels of the 2 products were the same.

From the preceding examples and description, it will be apparent to one skilled in the art that many modifications in the process and product of the invention may be made without departing from the spirit of the invention. It is intended to cover all such modifications which fall within the scope of the appended claims.

We claim:

1. A protein food product comprising a non-uniform mixture of chewy protein gel which has an unstretched, thermostable, hydrated, and unoriented structure and a minor amount of a kneaded dough.

2. A protein food product according to claim 1 in which the chewy protein gel comprises peanut protein.

3. A protein food product according to claim 1 in which the chewy protein gel comprises soy protein.

4. A protein food product simulating luncheon meat comprising a non-uniform mixture of chewy protein gel which has an unstretched, thermostable, hydrated, and unoriented structure and a minor amount of a kneaded dough, the dough being dispersed as streaks and layers between layers of the chewy protein gel.

5. A protein food product according to claim 4 in which the chewy protein gel comprises peanut protein.

6. A protein food product according to claim 4 in which the chewy protein gel comprises soy protein.

7. A pasteurized protein food product according to claim 4 in the form of slices each coated with fat.

8. A protein food product simulating luncheon meat comprising a non-uniform mixture of chewy protein gel which has an unstretched, thermostable, hydrated, and unoriented structure and minor amounts of a kneaded dough and a third phase selected from the group consisting of water, fat aqueous emulsions of fat, and aqueous suspensions of edible proteinaceous material, the dough being dispersed as streaks and layers between layers of the chewy protein gel and the third phase being randomly distributed in the form of pockets, globules and layers throughout the product.

9. A protein food product simulating luncheon meat comprising a non-uniform mixture of chewy protein gel which has an unstretched, thermostable, hydrated, and unoriented structure and a minor amount of a kneaded dough, the dough being dispersed as small, irregularly shaped particles in a menstruum of the chewy protein gel.

10. A protein food product according to claim 9 in which the chewy protein gel comprises peanut protein.

11. A protein food product according to claim 9 in which the chewy protein gel comprises soy protein.

12. A pasteurized protein food product according to claim 9 in the form of slices each coated with fat.

13. A protein food product resembling roast meat comprising cylinders of chewy protein gel which has an unstretched, thermostable, hydrated, and unoriented structure arranged in a plurality of layers with sheets of a kneaded dough dispersed between some of said layers.

14. A protein food product resembling hamburger comprising chewy protein gel which has an unstretched, thermostable, hydrated, and unoriented structure and a minor amount of a kneaded dough blended together in the form of a plurality of small chunks of a size approximating the particles of meat in hamburger.

15. A protein food product comprising a non-uniform mixture of protein gel precursor which is an aqueous dispersion of protein having a protein concentration of from about 14% to about 35% and a pH of from about 6 to about 7.5 and which is converted to a chewy protein gel upon heating plus a minor amount of a kneaded dough.

16. A protein food product according to claim 15 in which the protein gel precursor comprises peanut protein.

17. A protein food product according to claim 15 in which the protein gel precursor comprises soy protein.

18. A process for preparing a protein food product which simulates luncheon meat which comprises the steps of blending together a protein gel precursor which is an aqueous dispersion of protein having a protein concentration of from about 14% to about 35% and a pH of from about 6 to about 7.5 and a minor amount of a kneaded dough in such a manner that layers of gel precursor are divided by relatively thinner layers of dough, and heating the resultant mixture to impart chewiness thereto.

19. A process according to claim 18 in which the dough is used in an amount equal to from about 3 to about 30% by weight of the mixture.

20. A process according to claim 18 in which the protein comprises peanut protein.

21. A process according to claim 18 in which the protein comprises soy protein.

22. A process for preparing a protein food product which simulates luncheon meat which comprises the steps of blending together a kneaded dough, a protein gel precursor which is an aqueous dispersion of protein having a protein concentration of from about 14% to about 35% and a pH of from about 6 to about 7.5, and a third phase selected from the group consisting of water, fat, aqueous emulsions of fat, and aqueous suspensions of edible proteinaceous material in such a manner that the product becomes streaked with layers of dough and globules, layers and pockets of the third phase are dispersed throughout the resultant blend, and heating the resultant blend to impart chewiness thereto.

23. A process according to claim 22 including the subsequent steps of slicing, coating the resultant slices with fat and pasteurizing.

24. A process according to claim 22 in which the third phase is an aqueous emulsion of an edible fat.

25. A process according to claim 22 in which the third phase is an aqueous solution of soy protein.

26. In a process for the preparation of a protein food product the steps of adjusting the pH of a protein dispersion having a protein concentration of from about 14% to about 35% to a pH of about 8 to 9 and then adjusting the pH downwardly by the addition of acid to about 6 to 7.5.

27. A process for preparing a protein food product which simulates luncheon meat which comprises the steps of blending together a protein gel precursor which is an aqueous dispersion of protein having a protein concentration of from about 14% to about 35% and a pH of from about 6 to about 7.5 and a kneaded dough to provide a mixture in which irregularly shaped pieces of dough are embedded in a menstruum of protein gel precursor, and heating the resultant blend to impart chewiness thereto.

28. A process for the preparation of a protein food product resembling roast meat which comprises forming a plurality of layers of cylinders of protein gel precursor which is an aqueous dispersion of protein having a protein concentration of from about 14% to about 35% and a pH of from about 6 to about 7.5 and dispersing sheets of a kneaded dough between some of said layers, and heating the resultant layered assembly to impart chewiness thereto.

29. A process for the preparation of a protein food product resembling hamburger which comprises forming a non-uniform mixture of protein gel precursor which is an aqueous dispersion of protein having a protein concentration of from about 14% to about 35% and a pH of from about 6 to about 7.5 and a kneaded dough and dividing said mixture into a plurality of small chunks approximating the size of the particles of meat in hamburger, and heating the mixture to impart chewiness thereto.

References Cited in the file of this patent

UNITED STATES PATENTS

| | | |
|---|---|---|
| 670,283 | Kellogg | Mar. 19, 1901 |
| 869,371 | Kellogg | Oct. 29, 1907 |
| 2,560,621 | Wrenshall | July 17, 1951 |
| 2,682,466 | Boyer | June 29, 1954 |

FOREIGN PATENTS

| | | |
|---|---|---|
| 699,692 | Great Britain | Nov. 11, 1953 |